Dec. 5, 1933.    O. THIEL    1,937,800
FUEL DISCHARGE MEANS FOR ROTARY OIL BURNERS
Filed Feb. 1, 1932

INVENTOR.
Otto Thiel
BY
Francis D Hardesty
ATTORNEY.

Patented Dec. 5, 1933

1,937,800

UNITED STATES PATENT OFFICE 1,937,800

FUEL DISCHARGE MEANS FOR ROTARY OIL BURNERS

Otto Thiel, Detroit, Mich., assignor to Timken-Silent Automatic Company, Detroit, Mich., a corporation of Michigan Application February 1, 1932. Serial No. 590,208

9 Claims. (Cl. 158—77)

The present invention relates to fuel projectors for rotary liquid fuel burners, and has among its objects a fuel projector which is adjustable to provide for projection at a desired level.

In rotary liquid fuel burners of the type shown, for example in patent application Serial No. 533,129, filed April 27, 1931, it sometimes happens, particularly in the larger sizes, that the fuel is projected at a level too high above, or perhaps too close to the hearth, and as it is difficult to modify the hearth once installed, the desirability of being able to change the projection level is obvious.

An object of the present invention is therefore to provide for such adjustment without replacing the parts or interfering with the function.

Figure 1:
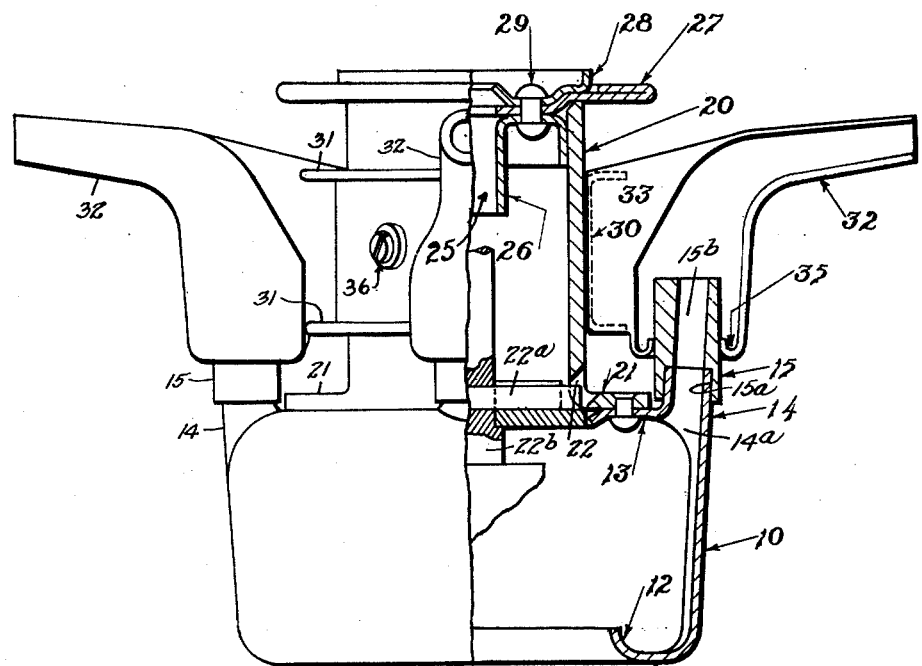
Figure 2:
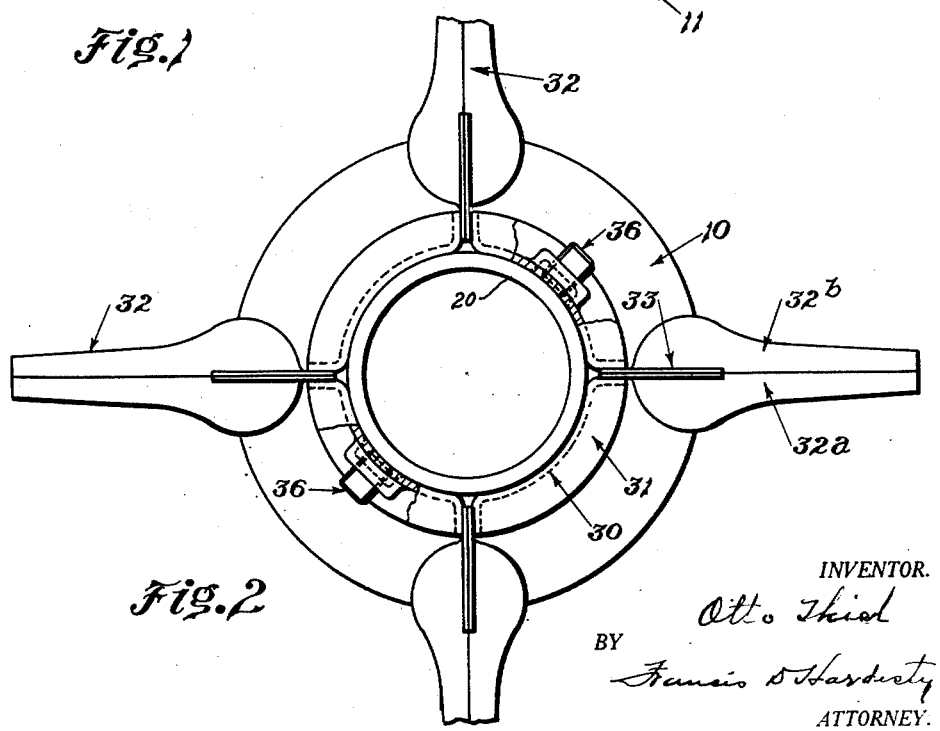

Other objects will readily appear to those skilled in the art upon reference to the following description and the accompanying drawing in which Figure 1 is a part elevation, part vertical central section through the projector and two oppositely disposed discharge tubes, and Figure 2 is a plan view with certain parts omitted.

As indicated, the projector preferably comprises a hollow body of circular section flaring slightly toward the top body or cup of metal 10 open at its bottom and having a flange 11 around the opening, said flange being turned inwardly radially of the body to form a trough 12 opening upwardly into the body. The body is also flanged or shouldered at its upper end, as at 13, and provided with tubular outlets 14 opening through flange 13 and a short distance above the flange, having fixed thereto tubular extensions 15.

Each tubular extension 15 has an angular counterbore 15a having the same inclination as the passage 14a through the tube 14. The main bore 15b of each extension 15 continues upwardly from said counterbore at the same inclination. Thus the axis of each extension is parallel to the axis of the cup 10, thereby permitting vertical adjustment by means hereinafter described notwithstanding the inclination of said passages.

A cylindrical tube or neck 20 having an outwardly extending flange 21 at its lower end is secured to the flange 13 of the body, and notched as at 22 to permit cooperation of supporting and driving elements 22a on a drive shaft 22b.

As the device is intended to be mounted upon a vertical drive shaft, suitable centering elements are provided. These are shown at 25 as an assembly comprising a lower sleeve or bushing element 26, a dished washer 27, extending beyond the neck 20, and an upper washer element 28, the three being fixed together as by rivets 29. This assembly 25 also serves to form of the neck 20, an air chamber which protects the interior of the device against heat.

The neck 20 carries around it a collar 30 preferably formed of four parts flanged as at 31 for stiffness. This collar carries, in the form shown, four discharge spouts or tubes 32 preferably produced by stamping two matching halves 32a and 32b, each of which has a rear wing 33 serving for attachment to collar 30, the assembly of collar, and spouts being made by welding the two half spouts together and then welding the four parts of the collar together with the wings 33 between adjacent ends of the collar parts.

The spouts 32 are preferably formed with their lower ends open but with the edges of the opening turned in and up to form a trough 35, and the opening large enough to slide over the extension tube 15. This small trough is intended to retain any liquid which may be discharged into spout 32, not discharged from the outer end thereof.

Vertical adjustment of the spouts 32 with respect to body 10 is provided by having the collar 30 of less width than the length of neck 20, and fixing the position by means of set screws 36.

When the device is mounted upon a rotatable vertical shaft, as mentioned above, and rapidly rotated, while liquid fuel is supplied to trough 12, such liquid, through centrifugal action, rises along the walls of body 10 and passes out through tubular outlets 14, extensions 15 and tubes 32.

Now having described the invention and the preferred form of embodiment thereof, it is to be understood that the said invention is to be limited not to the details herein set forth, but only by the scope of the claims which follow.

I claim:

1. A centrifugal fuel projector comprising a hollow circular body, having both ends open and flanged inwardly, the flange at the lower end having its edge turned into the body to form a trough, a plurality of tubular outlets extending from the other flange at the curved body wall parallel to the axis of the body, a coaxial cylindrical neck member fixed to said body at its upper end, a collar on said neck member and adjustable lengthwise thereof and a plurality of upwardly and outwardly extending spouts carried by said collar and having their lower ends telescoped over the said tubular outlets.

2. A centrifugal fuel projector for use with a vertical drive shaft comprising a substantially round cup-shaped element having a radially inwardly extending shoulder at its top and having an opening in its bottom surrounded by an annular trough opening upward within the body, tubular outlets extending upwardly from the shoulder of said cup-shaped element, an axially upwardly extending neck carried by said shoulder and upwardly and outwardly extending nozzles carried by the neck of said element and adapted to receive fuel from said outlets and discharge same horizontally.

3. A centrifugal fuel projector comprising a substantially round cup-shaped element having a radially inwardly extending shoulder at its top and having an opening in its bottom surrounded by an annular trough opening upward within the body, tubular outlets extending upwardly from the shoulder of said cup-shaped element, an axially upwardly extending neck carried by said shoulder and upwardly and outwardly extending nozzles carried by the neck of said element and adjustable lengthwise thereof.

4. A centrifugal fuel projector comprising a substantially round cup-shaped element having an opening in its bottom surrounded by an annular trough opening upward and having an upwardly extending neck at its top, tubular outlets extending upwardly from the upper edge of said cup, and upwardly and outwardly extending nozzles carried by said neck and adapted to receive fuel from said outlets and discharge same horizontally, said nozzles being provided with means for retaining fuel delivered thereto but not discharged therefrom.

5. A centrifugal fuel projector comprising a cup having an opening in its bottom surrounded by an annular trough opening upward into the cup and having an upwardly extending neck at its top, integral tubular outlets extending upwardly from the upper edge of said cup, and extensions carried by said outlets, said extensions having a cylindrical exterior and being axially parallel with said cup, and nozzles carried by said neck and adjustably telescoping over said extensions.

6. A centrifugal fuel projector comprising a substantially round cup-shaped element having a radially inwardly extending shoulder at its top and having an opening in its bottom surrounded by an annular trough opening upward within the body, integral tubular outlets extending upwardly from the shoulder of said element, and extensions carried by said outlets, said extensions having a cylindrical exterior and being axially parallel with said element, an axially upwardly extending neck carried by said shoulder and nozzles carried by the neck of said element and adjustably telescoping over said extensions, said nozzles being provided with means for retaining fuel delivered thereto but not discharged therefrom.

7. A centrifugal fuel projector comprising a cup having a lower portion adapted to receive liquid fuel and having discharge means at an upper level, said discharge means being mounted for vertical adjustment without changing the position of said cup.

8. A centrifugal fuel projector comprising a cup having a lower portion adapted to receive liquid fuel and discharge tubes mounted at the upper portion of said cup, said discharge tubes being adjustable vertically without changing the position of said cup.

9. A centrifugal fuel projector comprising a cup having an opening in its bottom surrounded by an annular trough opening upwardly into the cup and having an upwardly extending neck at its top, integral tubular outlets extending angularly upward from the upper edge of said cup and extensions carried by said outlets, each having a counterbore receiving one of said outlets and arranged at the same inclination as said outlet and having a bore continuing from said counterbore at the same angle of inclination, and each extension arranged so as to be axially parallel with said cup and neck, and nozzles carried by said neck and adjustably telescoping over said extensions.

OTTO THIEL.